Patented Feb. 12, 1924.

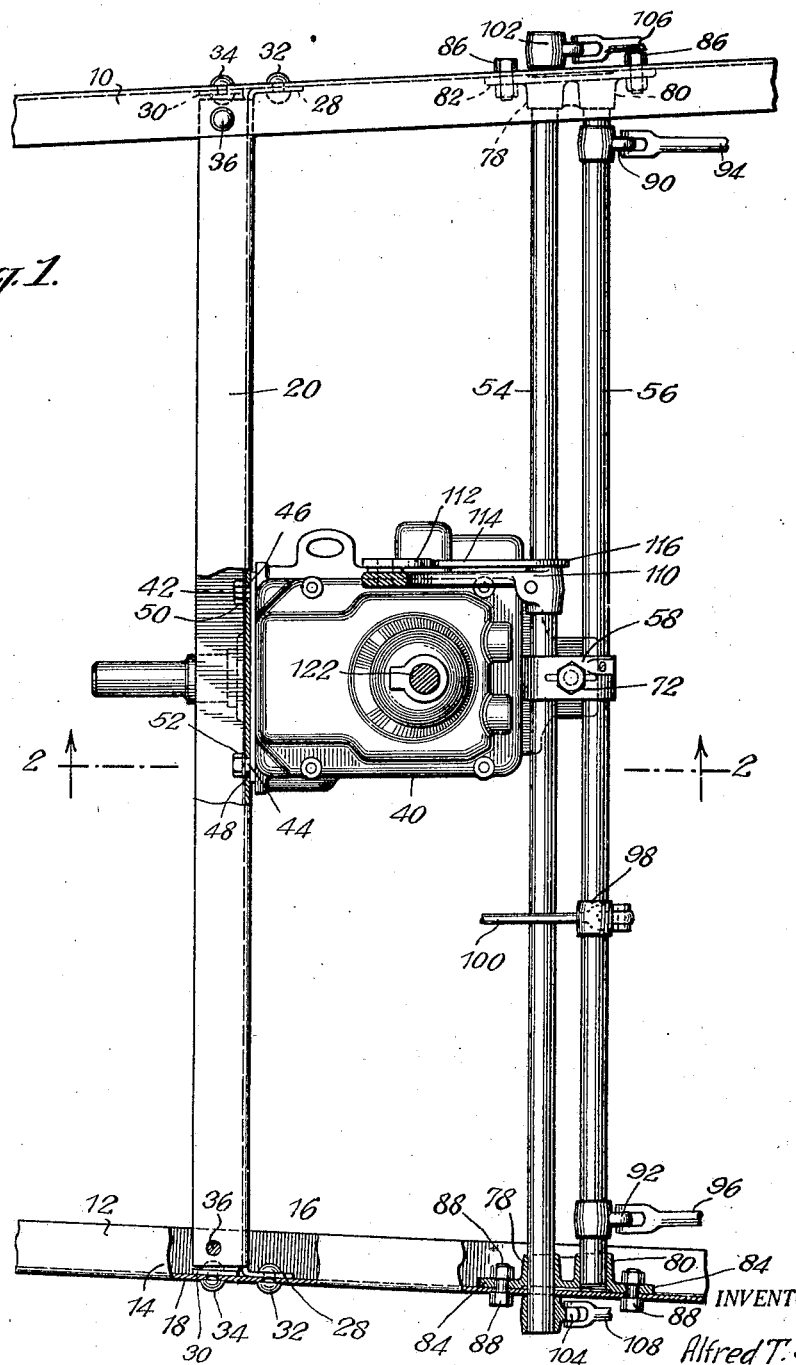

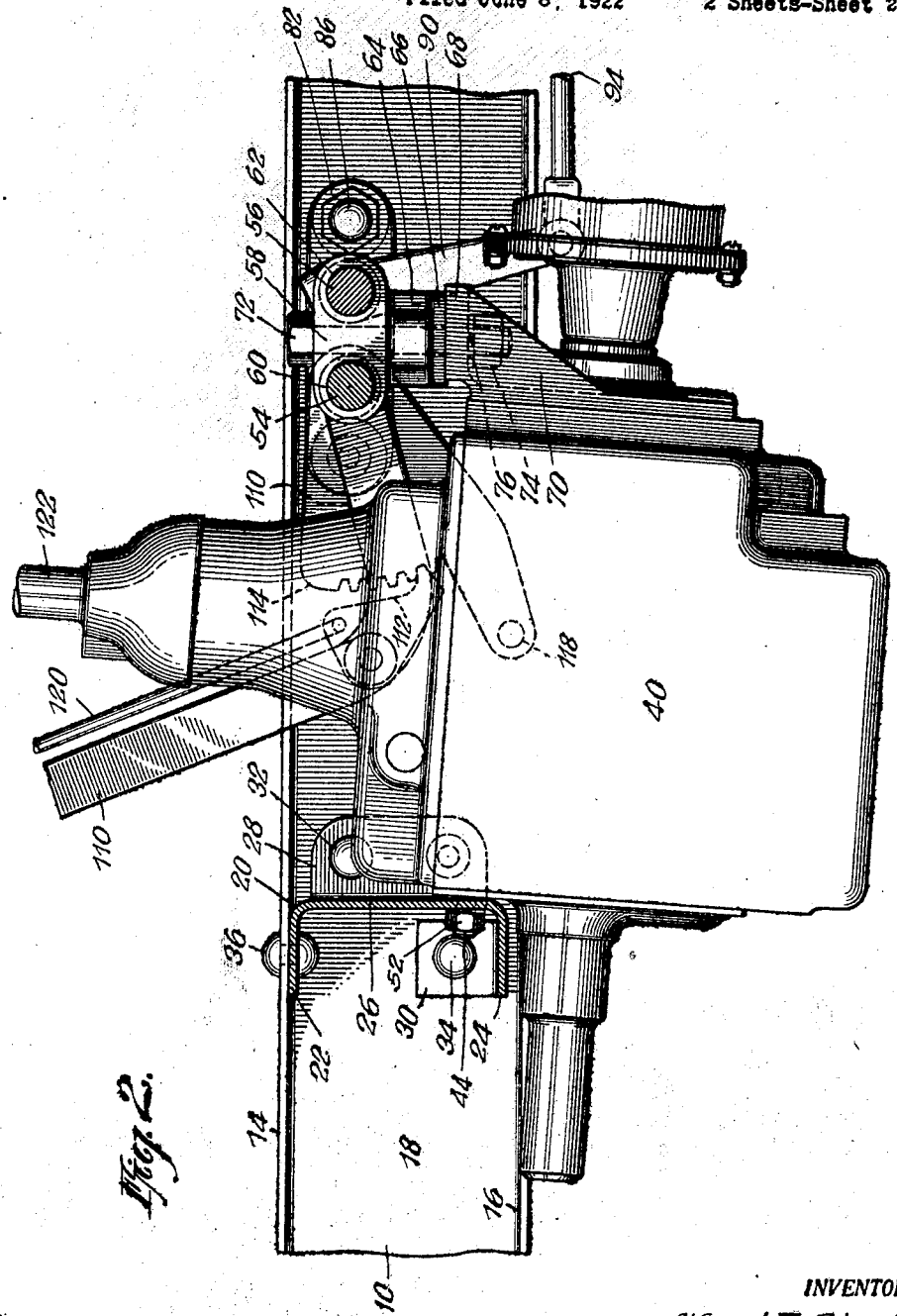

1,483,695

UNITED STATES PATENT OFFICE.

ALFRED T. STURT, OF FLINT, MICHIGAN, ASSIGNOR TO DURANT MOTORS INCORPORATED, A CORPORATION OF DELAWARE.

TRANSMISSION-SUPPORTING STRUCTURE.

Application filed June 8, 1922. Serial No. 566,746.

*To all whom it may concern:*

Be it known that I, ALFRED T. STURT, a citizen of the United States, and a resident of Flint, county of Genesee, State of Michigan, have invented certain new and useful Improvements in Transmission-Supporting Structures, of which the following is a specification.

This invention relates to motor vehicles and particularly to novel means for supporting the transmissions thereof.

The invention aims to provide means for securing the transmission to cross members which are secured to the chassis frame for other purposes. Such cross members thus serve double functions as will be apparent from the following description.

An embodiment of the invention is illustrated in the accompanying drawings in which:

Fig. 1 is a plan of a portion of a motor vehicle chassis showing the transmission carried by my novel supporting means.

Fig. 2 is an enlarged section on line 2—2 of Fig. 1, the transmission being shown in elevation.

In the drawings 10 and 12 represent the longitudinal side members of the chassis frame which are usually of channel shape, each comprising a top and bottom flange 14 and 16 respectively, and a web portion 18. Extending transversely from one side member to the other is an intermediate cross member 20 of channel shaped cross section comprising top and bottom flanges 22 and 24 and a web portion 26. At each end the web is bent at an angle to form an ear 28, and the flange 24 is similarly bent at each end to form an ear 30. Rivets 32 and 34 secure the ears 28 and 30 respectively to the webs 18 of each of the side members as shown. The top-flange 22 is secured by rivets 36 at each end to the adjacent flanges of the side members. The member 20 serves as a means to tie the two members 10 and 12 to each other to stiffen the frame and form a part of the foundation for the car body and in addition to these functions it also affords means for supporting one end of the transmission or casing 40 which encloses and carries the usual change speed gears.

The transmission has secured thereto two forwardly extending threaded studs 42 and 44 which project through holes 46 and 48 in the web 26 of the cross member 20 and nuts 50 and 52 are provided to securely hold the front of the transmission in place.

At the rear the transmission is suspended or supported from the two brake operating cross shafts 54 and 56. A fitting 58 is located centrally of the frame on said shafts and is formed with holes 60 and 62 through which said shafts loosely pass. The fitting 58 has a downwardly depending extension 64 terminating in a flanged seat or bearing surface 66 which seats on a flange 68 formed on a bracket 70 which is secured to the rear of the transmission 40. A bolt 72 passes through the fitting 58 and flange 68 and a nut 74 is secured to the lower end thereof to securely clamp the bracket 70 to said fitting, a suitable lock washer 76 being provided to prevent the nut from working loose.

The shafts 54 and 56 are mounted in bearing hubs 78 and 80 formed on brackets 82 and 84 which are secured to the side members 10 and 12 by bolts 86 and 88, as shown.

The shaft 56 carries depending levers 90 and 92 to which are connected rods or links 94 and 96 which lead to suitable service brakes, not shown. This shaft 56 also carries a lever 98 which is connected by a rod or link 100 with a suitable brake pedal, not shown, by which said shaft is rocked to apply the brakes.

The shaft 54 carries similar depending levers 102 and 104 which connect with links or rods 106 and 108 which lead to the emergency brakes, not shown. This shaft has secured thereto an emergency brake operating lever 110 which carries a locking pawl 112 arranged to engage a toothed sector 114 loosely supported at one end 116 on the shaft and secured to the side of the transmission by a stud 118 at its other end. The pawl 112 is adapted to be disengaged from the sector 114 by a rod 120 in the usual manner by a knob on the handle of the brake lever 110.

The transmission 40 carries the usual shifting lever 122 by which the change speed gearing may be shifted, as will be understood.

From the above it wil be seen that the transmission 40 is supported at the front by the frame member 20 and at the rear by the brake shafts 54 and 56. Thus these members perform their usual functions and in addition serve to carry the transmission. This eliminates the necessity of providing special supporting members for this unit and hence cuts down the total weight of the car and simplifies the chassis. The parts can be readily assembled and the arrangement is such that vibration is reduced and the power transmitting parts are relieved of carrying the weight of the transmission housing and associated and related parts.

While I have described with great particularity of detail the embodiment of the invention herein illustrated, it is not to be construed that I am limited thereto as changes in arrangement and substitution of equivalents may be made without departing from the spirit and scope of the invention as defined in the appended claims.

Having thus described my invention what I claim as new and desire to secure by Letters Patent is:—

1. In a motor vehicle, in combination with the main chassis frame, a brake operating shaft supported by said frame, a transmission and means supported by said brake operating shaft for supporting one end of said transmission.

2. In a motor vehicle, in combination with the main chassis frame, parallel shafts journaled on said frame and means carried by said shafts for supporting one end of the transmission.

3. In a motor vehicle, in combination with the main chassis frame, parallel brake operating shafts extending transversely of the frame and supported thereby, a transmission, and means carried by said brake shafts for supporting one end of said transmission.

4. In a motor vehicle, in combination with the main chassis frame, parallel brake operating shafts extending transversely of the frame and supported thereby, a transmission, and means for supporting said transmission including a member carried by said brake operating shafts.

5. In a motor vehicle, in combination with the main chassis frame, parallel brake operating shafts extending transversely of the frame and supported thereby, a transmission, a transverse member secured to and forming parts of said frame, means for securing one end of said transmission thereto, and a member carried by said brake operating shafts and secured to the other end of said transmission.

6. In a motor vehicle, a main chassis frame including longitudinal side members, and a transverse cross member, brake operating shafts, bearing brackets secured to said side members for pivotally supporting said brake shafts, a transmission, means for securing one end of said transmission to said transverse cross member, and means carried by said brake shafts for supporting the other end of said transmission.

7. In a motor vehicle, means for supporting the transmission thereof including a member carried by operating rock-shafts extending transversely of the vehicle.

8. In a motor vehicle, a main chassis frame, including longitudinal side members and a transverse cross member, operating shafts supported by said longitudinal side members, and extending transversely of the vehicle, a transmission, and means for supporting the same including securing devices engaging said transverse cross member and a bracket supported by said operating shafts and means for securing said bracket to the transmission.

In witness whereof I have hereunto set my hand at Long Island City, county of Queens, State of New York, this 5th day of June, 1922.

ALFRED T. STURT.